United States Patent
Chen et al.

(10) Patent No.: US 10,499,053 B2
(45) Date of Patent: Dec. 3, 2019

(54) METHOD OF IMPROVED DIRECTIONAL INTRA PREDICTION FOR VIDEO CODING

(71) Applicant: MEDIATEK INC., Hsin-Chu (TW)

(72) Inventors: Ching-Yeh Chen, Taipei (TW);
Yu-Wen Huang, Taipei (TW);
Xiaozhong Xu, Fremont, CA (US);
Shan Liu, San Jose, CA (US)

(73) Assignee: MEDIATEK INC., Hsinchu (TW)

( * ) Notice: Subject to any disclaimer, the term of this patent is extended or adjusted under 35 U.S.C. 154(b) by 131 days.

(21) Appl. No.: 15/521,513

(22) PCT Filed: Oct. 28, 2015

(86) PCT No.: PCT/CN2015/093048
§ 371 (c)(1),
(2) Date: Apr. 24, 2017

(87) PCT Pub. No.: WO2016/066093
PCT Pub. Date: May 6, 2016

(65) Prior Publication Data
US 2017/0310959 A1    Oct. 26, 2017

Related U.S. Application Data

(60) Provisional application No. 62/073,209, filed on Oct. 31, 2014.

(51) Int. Cl.
*H04N 19/105* (2014.01)
*H04N 19/176* (2014.01)
(Continued)

(52) U.S. Cl.
CPC ........... *H04N 19/105* (2014.11); *H04N 19/11* (2014.11); *H04N 19/117* (2014.11);
(Continued)

(58) Field of Classification Search
CPC .... H04N 19/105; H04N 19/11; H04N 19/117; H04N 19/176; H04N 19/182; H04N 19/593; H04N 19/82
See application file for complete search history.

(56) References Cited

U.S. PATENT DOCUMENTS 9,544,584 B2    1/2017   Lim et al.
2013/0022104 A1*  1/2013   Chen ................. H04N 19/70
375/240.02
(Continued)

FOREIGN PATENT DOCUMENTS

CN    103329538 A    9/2013
CN    103597831 A    2/2014
(Continued)

OTHER PUBLICATIONS

International Search Report dated Jan. 18, 2016, issued in application No. PCT/CN2015/093048.
(Continued)

*Primary Examiner* — Maria E Vazquez Colon
(74) *Attorney, Agent, or Firm* — Oblon, McClelland, Maier & Neustadt, L.L.P.

(57) ABSTRACT

A method of Intra prediction filtering to determine whether to turn on or off the Intra prediction filter based on interleaved Intra prediction mode sets implicitly is disclosed. In one embodiment, initial Intra prediction block is derived based on neighboring reconstructed pixels of the current block. If the Intra prediction filter is on for the current Intra prediction mode, the Intra prediction filter is applied to the initial Intra prediction block to form a filtered Intra prediction block and Intra prediction encoding or decoding is applied to the current block using the filtered Intra prediction block as a predictor for the current block. For example, Intra gradient filter can be applied for even modes of Intra (Continued)

prediction modes from v to (v+8) and/or from h and (h+8). Bi-directional Intra prediction filter can be applied to some or all other modes.

13 Claims, 4 Drawing Sheets

(51) Int. Cl.
  *H04N 19/117* (2014.01)
  *H04N 19/82* (2014.01)
  *H04N 19/593* (2014.01)
  *H04N 19/11* (2014.01)
  *H04N 19/182* (2014.01)

(52) U.S. Cl.
  CPC ......... *H04N 19/176* (2014.11); *H04N 19/182* (2014.11); *H04N 19/593* (2014.11); *H04N 19/82* (2014.11)

(56) References Cited

U.S. PATENT DOCUMENTS

| | | | |
|---|---|---|---|
| 2013/0107973 A1* | 5/2013 | Wang | H04N 19/70 375/240.29 |
| 2013/0279575 A1 | 10/2013 | Wang | |
| 2014/0085415 A1 | 3/2014 | Bici et al. | |
| 2014/0092980 A1 | 4/2014 | Guo et al. | |
| 2014/0218473 A1* | 8/2014 | Hannuksela | H04N 19/597 348/43 |
| 2014/0301463 A1 | 10/2014 | Rusanovskyy et al. | |
| 2015/0215652 A1 | 7/2015 | Lu et al. | |

FOREIGN PATENT DOCUMENTS

| | | |
|---|---|---|
| WO | 2004/008735 A2 | 1/2004 |
| WO | 2013/063455 A1 | 5/2013 |
| WO | WO 2014/045919 A1 | 3/2014 |
| WO | 2014/106692 A1 | 7/2014 |

OTHER PUBLICATIONS

Kang, J., et al.; "Non-RCE3: Implicit derivation for adaptively turning filtering off in intra prediction," Joint Collaborative Team on Video Coding (JCT-VC) of ITU-T SG 16 WP 3 and ISO/IEC JTC 1/SC 29/WG 11; 15th Meeting: Geneva, CH; Oct.-Nov. 2013; pp. 1-8.

Guo, M., et al.; "CE6 Subset d: Direction based Angular Intra Prediction;" Joint Collaborative Team on Video Coding (JCT-VC) of ITU-T SG16 WP3 and ISO/IEC JTC1/SC29/WG11; 7th Meeting: Geneva, CH; Nov. 2011; pp. 1-9.

Chang, Y.J., et al.; "Non-RCE3: Horizontal/vertical padding scheme for intra block copy;" Joint Collaborative Team on Video Coding (JCT-VC) of ITU-T SG 16 WP 3 and ISO/IEC JTC 1/SC 29/WG 11; 16th Meeting: San José, US; Jan. 2014; pp. 1-6.

Zhang, X., et al.; "CE9 Test A.1: Optionally disabling the usage of the intra boundary filters;" Joint Collaborative Team on Video Coding (JCT-VC) of ITU-T SG 16 WP 3 and ISO/IEC JTC 1/SC 29/WG 11; 19th Meeting: Strasbourg, FR; Oct. 2014; pp. 1-13.

Ouedraogo, N., et al., "On APS referring and updating," Joint Collaborative Team on Video Coding (JCT-VC) of ITU-T SG 16 WP 3 and ISO/IEC JTC 1/SC 29/WG 11; Apr.-May 2012; pp. 1-14.

* cited by examiner

METHOD OF IMPROVED DIRECTIONAL INTRA PREDICTION FOR VIDEO CODING

CROSS REFERENCE TO RELATED APPLICATIONS

The present invention claims priority to U.S. Provisional Patent Application, Ser. No. 62/073,209, filed on Oct. 31, 2014. The U.S. Provisional Patent Application is hereby incorporated by reference in its entirety.

TECHNICAL FIELD

The present invention relates video coding. In particular, the present invention relates to advanced Intra prediction to improve coding efficiency of Intra prediction.

BACKGROUND

High-Efficiency Video Coding (HEVC) is a new international video coding standard developed by the Joint Collaborative Team on Video Coding (JCT-VC). HEVC is based on the hybrid block-based motion-compensated DCT-like transform coding architecture. The basic unit for compression, termed coding unit (CU), is a 2N×2N square block. A CU may begin with a largest CU (LCU), which is also referred as coded tree unit (CTU) in HEVC and each CU can be recursively split into four smaller CUs until the pre-defined minimum size is reached. Once the splitting of CU hierarchical tree is done, each CU is further split into one or more prediction units (PUs) according to prediction type and PU partition. Each CU or the residual of each CU is divided into a tree of transform units (TUs) to apply 2D transforms such as DCT (discrete cosine transform) or DST (discrete sine transform).

Figure 1:
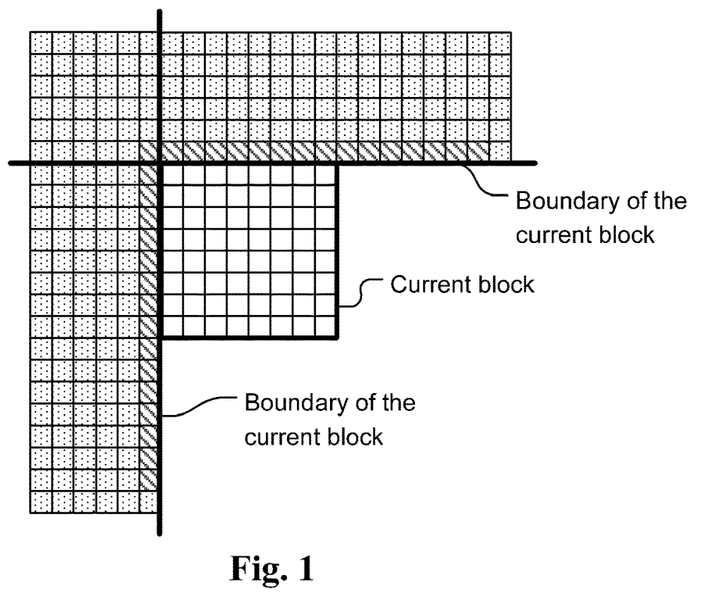
FIG. 1 illustrates an example of boundary neighboring reconstructed pixels used for generating Intra prediction sample according to the current HEVC (high efficiency video coding) standard.

In High Efficiency Video Coding (HEVC), the generation of Intra prediction samples includes three parts: Intra smoothing filter, Intra prediction, and Intra gradient filter. A smoothing operation is first applied to the reference samples as a pre-processing step before calculating the prediction. This smoothing operation corresponds to applying an FIR-filter corresponding to [121]>>2. The smoothing operation corresponds to applying low-pass filter to the samples in the left column and the above row of the current TU (transform unit). The Intra prediction of each TU is produced with the reconstructed samples of neighboring TUs. The samples involved in Intra smoothing are highlighted with line-filled blocks in FIG. 1. Whether this smoothing operation is used depends on the TU size and the Intra prediction mode. The Intra prediction of current block is then derived from neighboring reference samples adjacent to boundaries of the current block as shown by line-filled blocks in FIG. 1 for certain Intra prediction modes. The Intra prediction modes according to HEVC include DC mode, planar mode, and 33 directional modes. An Intra prediction mode is selected for a current block by the encoder and is signaled in the bitstream. After the initial Intra prediction samples are generated, Intra gradient filter is further applied to the initial Intra prediction samples at the left column and top row within the current TU when the Intra prediction mode is DC, horizontal, or vertical mode.

Figure 2:
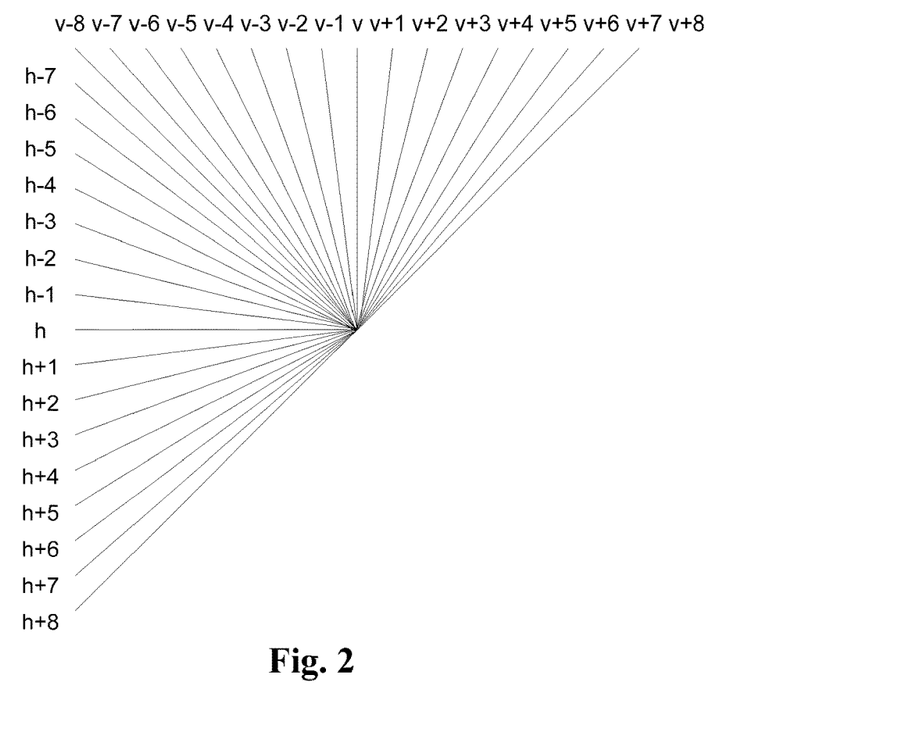
FIG. 2 illustrates the 33 Intra prediction directions and their corresponding designations according to the current HEVC (high efficiency video coding) standard.
Figure 3:
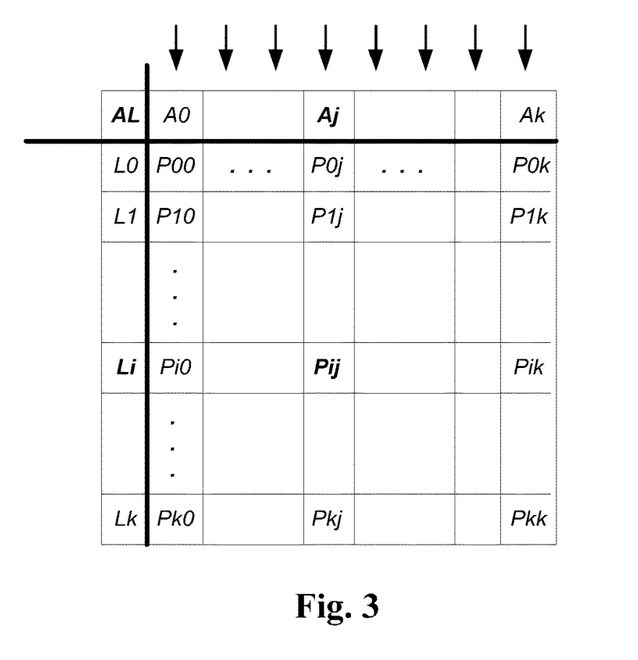
FIG. 3 illustrates an example Intra gradient filter for the vertical Intra prediction mode according to the current HEVC (high efficiency video coding) standard.

The concept of Intra gradient filter is to utilize the gradient information along the Intra prediction direction to improve the quality of Intra prediction. The Intra gradient filter is further extended to other Intra prediction modes as described in JCTVC-G279 (Guo, et al., *CE6 Subset d: Direction based Angular Intra Prediction*, Joint Collaborative Team on Video Coding (JCT-VC) of ITU-T SG16 WP3 and ISO/IEC JTC1/SC29/WG11, 7th Meeting: Geneva, CH, 21-30 Nov. 2011, Document: JCTVC-G279). For the 33 directional Intra prediction modes, the mode designation for various directions is shown in FIG. 2, where the mode designation is from h−7 through h+8 and from v−8 through v+8. For the Intra prediction modes from v to (v+8), Intra gradient filter is applied to selected Intra prediction samples. In the example of vertical Intra prediction mode (i.e., v), the Intra gradient filter is applied to the Intra prediction samples in the left column of the current block. Two boundary samples representing two reconstructed samples adjacent to the left column of the current block are located first for a current Intra prediction sample to be filtered. The gradient information is calculated based on the difference of the two boundary samples to improve the Intra prediction. FIG. 3 illustrates the example of Intra gradient filter for the vertical mode. $P_{ij}$ denotes the predictor at row i and column j. AL represents the reconstructed sample at the upper-left corner of the current block. $L_i$ represents the reconstructed sample adjacent to the left column of the current block. A new predictor is calculated according to:

$$P'ij = Pij + \alpha \cdot (Li - AL), \quad (1)$$

where $\alpha$ corresponds to the weighting factor and is a fractional number from 0 to 1 as determined according to j. For example, $\alpha = \frac{1}{2}$ when j=0, and $\alpha = \frac{1}{4}$ when j=1. $P'_{ij}$ is used as the final predictor. Similarly, the Intra gradient filter is also applied to the horizontal Intra prediction mode. As for the Intra gradient filter of the horizontal directional mode, the final predictor $P'_{ij}$ is calculated according to:

$$P'ij = Pij + \alpha \cdot (Aj - AL), \quad (2)$$

where Aj is the reconstructed sample in the above row as shown in FIG. 3.

Figure 4:
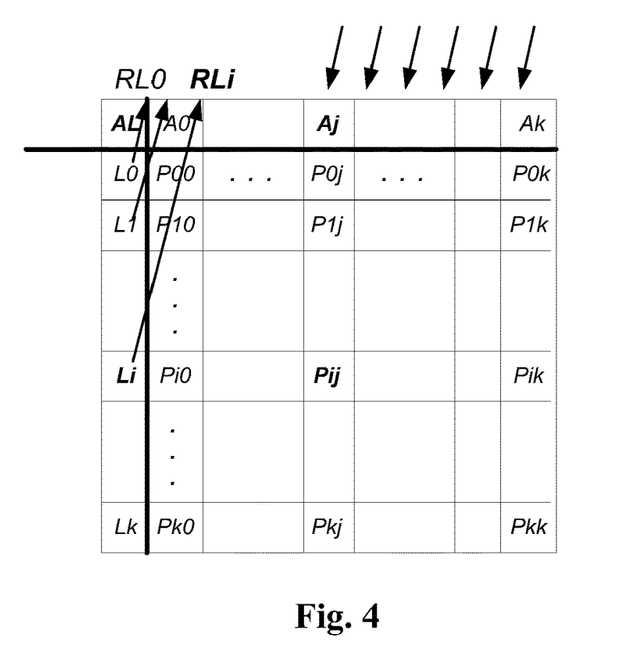
FIG. 4 illustrates an example Intra gradient filter for the Intra prediction modes from (v+1) to (v+8) according to the current HEVC (high efficiency video coding) standard

As for the directional modes from (v+1) to (v+8), the Intra gradient filter process will first identify a reference sample RLi along the direction of Intra prediction for a corresponding boundary sample Li. If $RL_i$ is not located at an integer pixel position, RLi can be generated by interpolation of integer pixels in the above boundary row. The Intra gradient filter is applied to Intra prediction samples in selected columns of the current Intra prediction mode. An example of gradient based prediction for directional mode from (v+1) to (v+8) is shown in FIG. 4. The final predictor $P'_{ij}$ is calculated according to:

$$P'ij = Pij + \alpha \cdot (Li - RLi). \quad (3)$$

Similar to the vertical directional mode, $\alpha$ is a fractional number from 0 to 1 and is selected according to j.

Similar gradient based prediction is applied to directional modes from (h+1) to (h+8). A reference sample Raj in the boundary column adjacent to the left column of the current block along the direction of Intra prediction is determined for a corresponding boundary sample Aj first. If RAj is not located at an integer pixel position, RAj can be generated by interpolation of integer pixels in the left column. The final predictor $P'_{ij}$ is calculated according to:

$$P'ij = Pij + \alpha \cdot (Aj - RAj), \quad (4)$$

where $\alpha$ is a fractional number from 0 to 1 and is selected according to i.

For directional modes from v to (v+8) and from h to (h+8), the Intra gradient filter is applied to multiple Intra prediction columns or rows in the Intra prediction block. However, in HEVC, the Intra gradient filter is only applied to selected samples in the first row, first column or both the first row and first column of the Intra prediction block when the Intra prediction mode is DC, horizontal, or vertical mode. For example, if the Intra prediction is DC mode, the samples at the first row and first column are filtered by Intra gradient filter. If the Intra prediction is horizontal mode, then the samples at the first row are filtered by Intra gradient filter. If the Intra prediction is vertical mode, then the samples at the first column are further filtered by Intra gradient filter.

Figure 5:
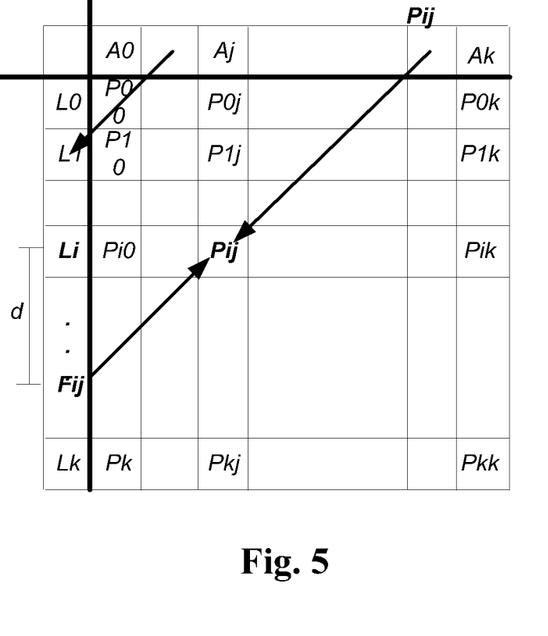
FIG. 5 illustrates an example bi-directional prediction filter for the Intra prediction modes from (v+1) to (v+8) according to the current HEVC (high efficiency video coding) standard.

Besides Intra gradient filtering, another smoothing filter called bi-directional Intra prediction is also disclosed to improve the quality of Intra prediction in JCT-VC meetings, where bi-directional Intra prediction is also referred to as bi-boundary intra prediction. For directional Intra prediction modes (v+1) to (v+8) and (h+1) to (h+8), a weighted sum of a reconstructed sample in the above boundary row and a reconstructed samples in the left boundary column along the Intra prediction mode direction is used as the Intra predictor. An example of bi-directional Intra prediction for directional modes from (v+1) to (v+8) is shown in FIG. 5. For each Intra prediction sample Pij, a corresponding reference sample Fij in the left column along the prediction direction is identified. If Fij is not located at an integer pixel position, Fij is generated by interpolation of integer pixels in the left column. Then the final predictor $P'_{ij}$ is calculated as the weighted sum of Pij and Fij according to:

$$P'ij=\alpha \cdot Pij+(1-\alpha) \cdot Fij, \quad (5)$$

α is a fractional number from 0 to 1 and is selected according to the direction of Intra prediction and j for (v+1) to (v+8) directional modes.

For the directional modes (h+1) to (h+8), the bi-directional Intra prediction can be derived similarly. In this case, Fij corresponds to a reference sample in the above row. If Fij is not located at an integer pixel position, Fij is generated by interpolation of integer pixels in the above row. The final predictor P is calculated as the weighted sum of Pij and Fij according to equation (5), where a is a fractional number from 0 to 1 and is selected according to the direction of Intra prediction and i for (h+1) to (h+8) directional modes.

After generating Intra predictors, the prediction error is formed between a current block and its corresponding predictor. The prediction error is further processed by transform, quantization and entropy coding. For entropy coding, the quantized coefficients are divided into multiple 4×4 coefficient groups, first. The coding order of different coefficient groups and scan order of coefficients in one coefficient group is selected according to Intra prediction mode and transform size. If the transform size is smaller than or equal to 8×8, then intra-mode-dependent scan will be used for the coding order of different coefficient groups and scan order of coefficients in one coefficient group. Otherwise, diagonal scan is used for the coding order of different coefficient groups and scan order of coefficients in one coefficient group.

It is desirable to develop Intra prediction filter to further improve coding efficiency.

SUMMARY

A method of Intra prediction filtering to determine whether to turn on or off the Intra prediction filter based on interleaved Intra prediction mode sets implicitly is disclosed. In one embodiment, initial Intra prediction block is derived based on neighboring reconstructed pixels of the current block according to a current Intra prediction mode. If the Intra prediction filter is on for the current Intra prediction mode, the Intra prediction filter is applied to the initial Intra prediction block to form a filtered Intra prediction block and Intra prediction encoding or decoding is applied to the current block using the filtered Intra prediction block as a predictor for the current block.

In one embodiment, the Intra prediction filter corresponds to Intra gradient filter, and wherein the Intra prediction filter is on if the current Intra prediction mode belongs to a first interleaved Intra prediction mode set. The first interleaved Intra prediction mode set corresponds to a plurality of directional Intra prediction modes selecting from (v+0) through (v+Nv), from (h+0) through (h+Mh), or both, where Nv and Mh are positive integer numbers. For example, the first interleaved Intra prediction mode set corresponds to {(v+0), (v+2), (v+4), (v+6), (v+8)}, {(h+0), (h+2), (h+4), (h+6), (h+8)}, or both. In another example, the first interleaved Intra prediction mode set corresponds to {(v+0), (v+1), (v+3), (v+5), (v+7)}, {(h+0), (h+1), (h+3), (h+5), (h+7)}, or both. In yet another example, the first interleaved Intra prediction mode set corresponds to {(v+1), (v+3), (v+5), (v+6)}, {(h+1), (h+3), (h+5), (h+6)}, or both.

When the Intra gradient filter is used, the Intra prediction filter process will identify two boundary neighboring reconstructed pixels located in a top boundary row or a left boundary column adjacent to the current block according to the current Intra prediction mode. A weighted difference of the two boundary neighboring reconstructed pixels is added to each Intra prediction sample in one or more selected columns or rows of the initial Intra prediction block to form the filtered Intra prediction block. If any of the two boundary neighboring reconstructed pixels is not located at one integer position in the top boundary row or the left boundary column adjacent to the current block, interpolation is used to generate any of the two boundary neighboring reconstructed pixels not at one integer position.

In yet another embodiment, the Intra prediction filter corresponds to bi-directional Intra prediction filter, and where the Intra prediction filter is on when the current Intra prediction mode belongs to a second interleaved Intra prediction mode set. The Intra prediction filter process will identify two boundary neighboring reconstructed pixels located in a top boundary row and a left boundary column adjacent to the current block according to the current Intra prediction mode. If one or both boundary neighboring reconstructed pixels are unavailable for the current block, one or more unavailable boundary neighboring reconstructed pixels are padded with padded data to form padded reference samples. The bi-directional Intra prediction is applied based on the padded reference samples to selected initial Intra prediction sample in selected rows or columns of the initial Intra prediction block to form the filtered Intra prediction block. If any of the two boundary neighboring reconstructed pixels is not located at one integer position in the top boundary row or the left boundary column adjacent to the current block, interpolation is used to generate any of the two boundary neighboring reconstructed pixels not at one integer position.

The padded data can be generated by repeating from one or more available neighboring reconstructed pixels, extending from one or more available neighboring reconstructed pixels with even/odd symmetry, or setting the padded data to pre-defined pixel value.

The bi-directional Intra prediction filtering can be enabled or disabled according to indication in a sequence level, picture level, or slice level. The second interleaved Intra prediction mode set can be determined depending on block size of current block, wherein the current block corresponds to a coding unit (CU) or a transform unit (TU).

In yet another embodiment, Intra gradient filter is applied to the initial Intra prediction block to form a filtered Intra prediction block if the current Intra prediction mode belongs to an interleaved subset of selected directional Intra prediction modes.

In yet another embodiment, bi-directional Intra prediction is applied to selected initial Intra prediction sample in selected rows or columns of the initial Intra prediction if the current Intra prediction mode belongs to a set of selected directional Intra prediction modes. If one or both boundary neighboring reconstructed pixels are unavailable for the current block, one or more unavailable boundary neighboring reconstructed pixels are padded with padded data to form padded reference samples. The padded reference samples are then used for the directional Intra prediction. Again, the padded data can be generated by repeating from one or more available neighboring reconstructed pixels, extending from one or more available neighboring reconstructed pixels with even/odd symmetry, or setting the padded data to pre-defined pixel value.

DETAILED DESCRIPTION

As mentioned before, the Intra gradient filter and bi-directional Intra prediction according to the HEVC (high efficiency video coding) standard and JCTVC-G279 is applied to Intra prediction modes from (v+1) to (v+8) and from (h+1) to (h+8). However, such application may not achieve the best coding performance. In order to improve the coding efficiency of Intra prediction, new methods to derive or refine the Intra predictor for video coding are disclosed as follow.

First Embodiment

In HEVC, the Intra gradient filter is used only for the Intra prediction mode equal to DC, horizontal, or vertical mode. According to JCTVC-G279, the Intra gradient filter can be applied on all directional modes from v to (v+8) and from h to (h+8). Applying the Intra gradient filter to all directional modes from v to (v+8) and from h to (h+8) will increase the complexity substantially due to the increased number of filtered rows/columns. However, the coding efficiency may not be increased for all modes in the group of selected Intra prediction modes. In order to solve this problem, an Intra gradient filter for a group of interleaved Intra prediction modes is disclosed, the proposed scheme is also referred to as "Interleaved Intra gradient filter". In other words, Intra gradient filter is applied in an interleaved fashion to the directional modes from v to (v+Nv) and/or from h to (h+Mh), where Nv and Mh are positive integers. For example, Nv and Mh can be equal to 8 or 6, and Intra gradient filter will only be applied to the even Intra prediction modes, i.e., v, (v+2), (v+4), (v+6) and (v+8), and/or h, (h+2), (h+4), (h+6) and (h+8). In another example, the interleaved Intra prediction mode set to apply the Intra gradient filter correspond to {(v+0), (v+1), (v+3), (v+5), (v+7)}, {(h+0), (h+1), (h+3), (h+5), (h+7)}, or both. In yet another example, the interleaved Intra prediction mode set to apply the Intra gradient filter correspond to {(v+1), (v+3), (v+5), (v+6)}, {(h+1), (h+3), (h+5), (h+6)}, or both. For other Intra prediction modes, Intra prediction samples will not be filtered by Intra gradient filter.

In the above example of interleaved Intra prediction modes, Intra gradient filter is on for every other directional Intra prediction mode (e.g., even or odd directional modes from v to (v+8) and/or from h to (h+8)). However, other interleaving patterns may also be used. For example, the pattern can be every other two directional Intra prediction modes. In other words, the on/off pattern for applying the Intra gradient filter to the directional Intra prediction modes from v to (v+8) and/or from h to (h+8) can be {on, on, off, off, on, on, off, off, on}. In another example, the pattern can be every other three directional Intra prediction modes. The on/off pattern for applying the Intra gradient filter to the directional Intra prediction modes from v to (v+8) and/or from h to (h+8) can be, for example, {on, on, on, off, off, off, on, on, on}. In yet another example, the interleaving pattern for applying the Intra gradient filter to the directional Intra prediction modes from v to (v+8) and/or from h to (h+8) is not uniform, and can be {on, off, off, on, off, off, on, on, off}, {on, on, off, on, off, on, off, on, off}, {off, on, on, off, off, on, on, off, off}, {on, off, off, on, on, off, on, off, on}, {off, on, off, on, off, on, on, off, off}, or {on, off, on, off, on, on, off, off, on}, the present application is not limited thereto.

In one example, whether the Interleaved Intra gradient filter is enabled or disabled can be indicated in a sequence level, picture level, or slice level. In another example, whether the Interleaved Intra gradient filter is enabled or disabled may be dependent on the block size of the current block, where the current block corresponds to a coding unit (CU) or a transform unit (TU). For instance, the Interleaved Intra gradient filter can only be applied to CU or TU with a size smaller than or equal to a threshold. However, the intra gradient filter is always enabled or disabled for CU or TU with a size larger than the threshold. The size constraint can be signaled at sequence level, picture level, or slice level.

The present application also discloses a mode coding scheme associated with the Interleaved Intra gradient filter. For example, assuming that the original most probable mode (MPM) is {Dir, Dir+1, Dir−1}, where Dir represents a directional Intra prediction mode. When the Interleaved Intra gradient filter is enabled, the MPM mode can be changed as {Dir, Dir+N, Dir−N}, where Dir+N and Dir−N are directional Intra prediction modes closest to Dir with the same intra gradient filter process (enabled or disabled).

The Intra prediction filter according to this embodiment may result in more distinct Intra predictors for two successive Intra prediction modes. This is especially true when the TU size is small. The interleaved Intra prediction filter also has the potential to improve the coding performance.

Second Embodiment

Figure 6:
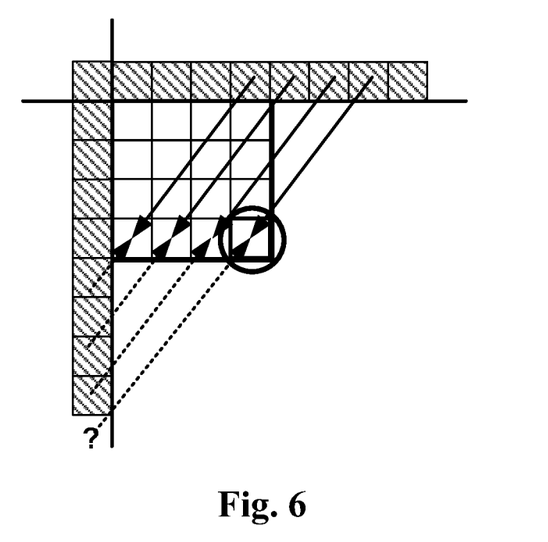
FIG. 6 illustrates an example of an unavailable boundary neighboring reconstructed pixel for bi-directional Intra prediction filter.

In bi-directional Intra prediction, the final Intra predictor is a weighted sum of Pij and Fij. However, the Fij may not be available for the current block. This occurs more likely especially when the number of rows/columns processed by bi-directional Intra prediction increases. FIG. 6 illustrates an example of an unavailable boundary neighboring reconstructed pixel. The boundary neighboring reconstructed pixels for the current block are shown as line-filled pixel areas, which are located in a top boundary row and a left boundary column adjacent to the current block. The top boundary row extends beyond the width of the current block as shown in FIG. 6. Similarly, the left boundary column also extends downward beyond the height of the current block. For the Intra prediction direction indicated by the arrows, sample Fij for the Intra prediction sample indicated by a circle is not available (indicated by "?" in FIG. 6) since this sample Fij is outside the left boundary column. This imposes a difficulty for applying bi-directional Intra prediction to more directional Intra modes or more to-be-processed rows/columns.

In order to solve this problem, a padding technique is disclosed according to an embodiment of the present invention. According to the padding process, when Fij is not included in the reconstructed samples of neighboring TUs, padding techniques are used to generate Fij for bi-directional Intra prediction for all selected directional Intra modes. The padding technique is also useful for the case with increased number of rows/columns processed by bi-directional Intra prediction. In this case, it becomes more likely that Fij is not included in the reconstructed samples of neighboring TUs.

Various padding techniques are known in the field. For example, the padded data can be generated by repeating from one or more available neighboring reconstructed pixels, extending from one or more available neighboring reconstructed pixels with even/odd symmetry, or setting the padded data to pre-defined pixel value. Furthermore, if any of the two boundary neighboring reconstructed pixels is not located at one integer position in the top boundary row or the left boundary column adjacent to the current block, interpolation can be used to generate any of the two boundary neighboring reconstructed pixels not at one integer position.

The selected directional Intra prediction modes for applying the bi-directional Intra prediction filter may be dependent on the block size of current block, where the current block corresponds to a coding unit (CU) or a transform unit (TU). Furthermore, whether bi-directional Intra prediction filtering is enabled or disabled can be indicated in a sequence level, picture level, or slice level.

Third Embodiment

In this embodiment, whether to turn on or off Intra prediction filter can be determined based on interleaved Intra prediction mode sets implicitly. For example, the Intra gradient filter can be applied to a first interleaved directional Intra prediction mode set. For those directional Intra prediction modes not belonging to the first interleaved directional Intra prediction mode set, the bi-directional Intra prediction filter can be applied for some or all of those directional Intra prediction modes. Various techniques associated with individual Intra gradient filter or bi-directional Intra prediction filter mentioned above can also be applied to this embodiment. For example, the selection of the interleaved Intra prediction mode set for the Intra gradient filter mentioned above is also applicable to this embodiment. In one example, the Intra gradient filter will only be applied to the directional Intra prediction modes v, (v+2), (v+4), and (v+6), and/or h, (h+2), (h+4) and (h+6). For bi-directional Intra prediction filter, it can be applied for directional Intra prediction modes equal to (v+8) and/or (h+8). In another example, the bi-directional Intra prediction filter can be applied for directional Intra prediction modes equal to (v+7) and (v+8) and/or (h+7) and (h+8).

In yet another example, the first interleaved directional Intra prediction mode set comprises the directional intra prediction modes from v to (v+Nv) and/or from h to (h+Mh), where Nv and Mh are positive integers and can be identical or different. In one example, Nv and Mh are both equal to 8. In another example, Nv and Mh are both equal to 4. The Intra gradient filter can be applied to all directional intra prediction modes belonging to the first interleaved directional Intra prediction mode set, while the bi-directional Intra prediction filter can be applied to the rest of the directional intra prediction modes (i.e., those directional Intra prediction modes not belonging to the first interleaved directional Intra prediction mode set).

In the foregoing embodiments, the number of to-be-filtered pixels in the intra gradient filter or the bi-directional Intra prediction filter depends on the size of the current block, where the current block corresponds to a coding unit (CU) or a transform unit (TU). For example, the number of to-be-filtered pixels in intra gradient filter or bi-directional Intra prediction filter can be increased when the size of the current block is large. The number of to-be-filtered pixels in intra gradient filter or bi-directional Intra prediction filter can be small when the size of the current block is small.

Fourth Embodiment

In the current HEVC standard, the Intra residual is coded by CABAC (context adaptive binary arithmetic coding) with the scan order which depends on the Intra prediction mode and TU size. If the transform size is smaller than or equal to 8×8, then intra-mode-dependent scan will be used for the coding order of coefficient groups in one TU and scan order of coefficients in one coefficient group. Otherwise, diagonal scan is used for the coding order of coefficient groups in one TU and scan order of coefficients in one coefficient group. In order to further simplify the Intra residual coding, a diagonal scan for the coding order of coefficient groups in one Intra TU is disclosed. When different square or non-square transform sizes are used, intra-mode-dependent scans for the coding order of coefficient groups in one TU will require increased computation complexity. This may also introduce some redundancy between different scan orders. For example, if the transform type is non-square transform with size equal to 16×4, then the coding orders among diagonal scan, horizontal scan, and vertical scans of coefficient groups in one TU are exactly the same. As the supported transform size increases, more memories are needed to store the coding orders of coefficient groups in one TU for different scan patterns. Therefore, diagonal scan for the coding order of coefficient groups in one TU is used to simply the computation with little coding performance loss. In additional to the scan order of coefficient groups in one TU, intra-mode-dependent scan is also used as the scan order of coefficients in one coefficient group for all TUs. According to the current practice, one TU is divided into multiple 4×4 coefficient groups and only three scans for one 4×4 coefficient group need to be designed. Therefore, intra-mode-dependent scan can be used as the scan order of coefficients in one coefficient group for all TUs without extra cost.

ALF Syntax

Besides the improvement of Intra coding, another aspect of the present invention addresses the syntax design of adaptive loop filter (ALF). ALF has been disclosed in HEVC standard meeting. The ALF parameter set is signaled at picture level and ALF on/off flag associated with coding tree block data is signaled at coding-tree-unit level. For example, ALF parameter set can be signaled in adaptive parameter set. Adaptive parameter set (APS) is a type of independent picture parameter sets as described for HEVC. APS can be referenced by different pictures. In this case, the information in adaptive parameter set can be referenced by different pictures regardless of the dependency between different pictures. Therefore, the functionality of random access will not be affected. In another implementation case, ALF parameter set can be coded in a picture-level header associated with one individual picture, instead of independent picture parameter set. In this case, the functionality of random access may not be provided if referencing ALF parameter set requires data across a random access point. For example, there are 60 frames in one bitstream, the first frame and 30-th frame are random access points, and one ALF parameter set is coded in the picture-level header of the 27-th frame. This ALF parameter set is used for the 27-th frame. If the ALF parameter set is referenced by the 32-nd frame, while the 30-th frame being a random access point, frames from the 32-th frame to the last frame cannot be directly decoded from the bitstream since the 32-nd frame refers to the ALF parameter set of the 27-th frame. The functionality of random access cannot be achieved in this case. Therefore, according to another embodiment of the present invention, referencing to the ALF parameter set is disallowed when referencing to ALF parameter set crosses any random access points to remove data dependency across a random access point. In the above example, if the rule is applied, referencing to the ALF parameter set in the 27-th frame for the 32-nd frame will be forbidden due to data dependency across the random access point associated with the 30-th frame. Hence, the functionality of random access can be guaranteed. In yet another embodiment, the buffer of ALF parameter sets for the reference is reset by other frames when decoding one random access picture.

Figure 7:
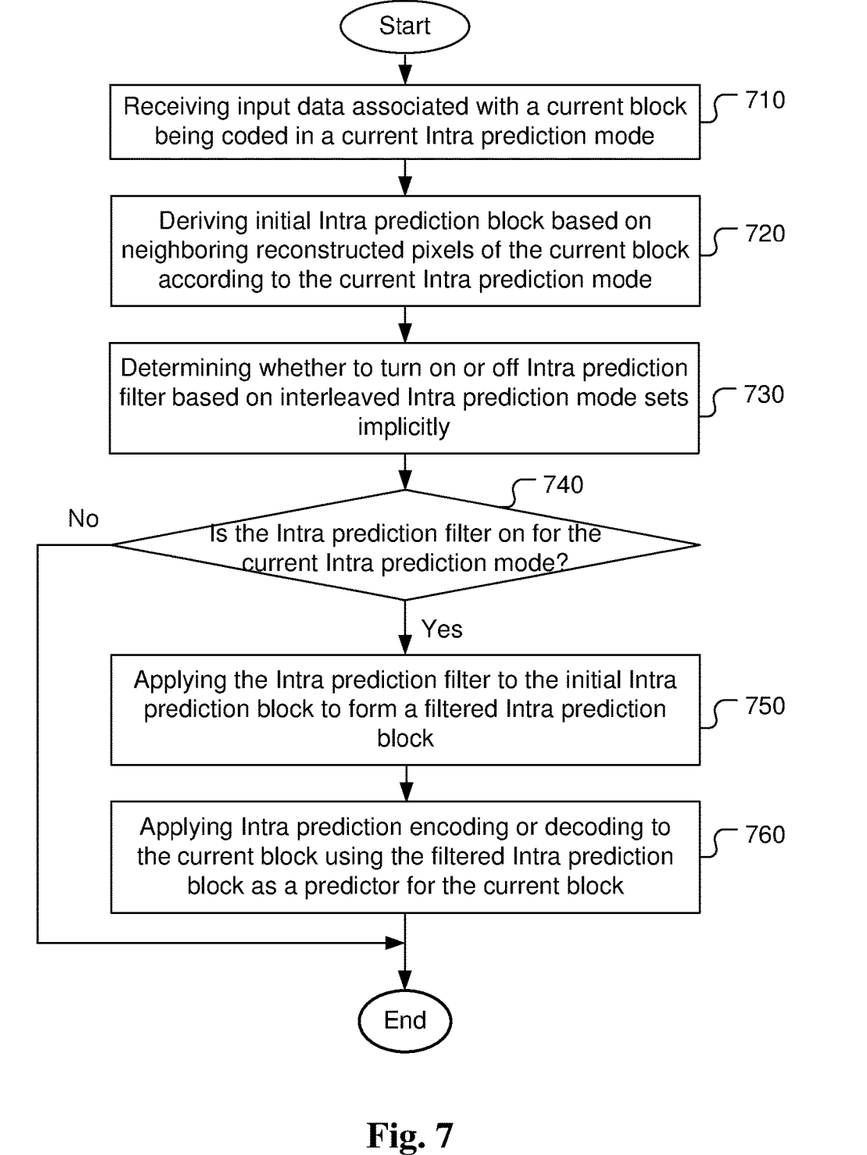
FIG. 7 illustrates an exemplary flowchart of a coding system incorporating Intra prediction filtering according to an embodiment of the present invention.

FIG. 7 illustrates an exemplary flowchart of a coding system incorporating Intra prediction filtering according to an embodiment of the present invention. The system receives input data associated with a current block being coded in a current Intra prediction mode in step 710. The input data may correspond to pixel data of the current block to be coded at the encoder side or the coded data of the current block in the decoder side. The current block may be retrieved from storage such as a computer memory of buffer (RAM or DRAM). The video bitstream may also be received from a processor such as a processing unit or a digital signal. The initial Intra prediction block is derived based on neighboring reconstructed pixels of the current block according to the current Intra prediction mode in step 720. Whether to turn on or off Intra prediction filter is determined based on interleaved Intra prediction mode sets implicitly in step 730. Whether the Intra prediction filter is on for the current Intra prediction mode is checked in step 740. If the Intra prediction filter is on for the current Intra prediction mode (i.e., the "Yes" branch), steps 750 and 760 are performed. Otherwise (i.e., the "No" path), steps 750 and 760 are skipped. In step 750, the Intra prediction filter to the initial Intra prediction block is applied to form a filtered Intra prediction block. In step 760, Intra prediction encoding or decoding is applied to the current block using the filtered Intra prediction block as a predictor for the current block.

The flowchart shown above is intended to illustrate examples of Intra prediction filtering according an embodiment of the present invention. A person skilled in the art may modify each step, re-arranges the steps, split a step, or combine steps to practice the present invention without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more electronic circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of sharing information in a video coding device, the method comprising, for all picture areas of a bitstream:
  deriving samples of a particular picture area of the bitstream; and
  when a loop filter is determined to be applied to the particular picture area by referring to a loop filter parameter set associated with a previously decoded picture area of the bitstream, identifying the loop filter parameter set associated with the previously decoded picture area, any picture area after the previously decoded picture area and before the particular picture area in terms of a displaying order being free from being a random access point picture area of the bitstream, and applying the loop filter to the samples of the particular picture area by referring to the identified loop filter parameter set associated with the previously decoded picture area.

2. The method of claim 1, wherein the loop filter comprises an adaptive loop filter (ALF).

3. The method of claim 1, wherein the loop filter parameter set associated with the previously decoded picture area is incorporated in a picture area-level header.

4. The method of claim 1, wherein the loop filter parameter set associated with the previously decoded picture area is incorporated in an Adaptive parameter set (APS).

5. The method of claim 1, wherein the loop filter parameter set associated with the previously decoded picture area is stored in a buffer, and the buffer is reset when decoding a picture area being a random access point picture area of the bitstream.

6. The method of claim 1, wherein the loop filter parameter set associated with the previously decoded picture area is stored in a buffer, and the buffer is reset after decoding a picture area being a random access point picture area of the bitstream.

7. A video coding device, comprising:
a processing circuit configured to, for all picture areas of a bitstream:
derive samples of a particular picture area of the bitstream; and
when a loop filter is determined to be applied to the particular picture area by referring to a loop filter parameter set associated with a previously decoded picture area of the bitstream,
identify the loop filter parameter set associated with the previously decoded picture area, any picture area after the previously decoded picture area and before the particular picture area in terms of a displaying order being free from being a random access point picture area of the bitstream, and
apply the loop filter to the samples of the particular picture area by referring to the identified loop filter parameter set associated with the previously decoded picture area.

8. The video coding device of claim 7, wherein the loop filter comprises an adaptive loop filter (ALF).

9. The video coding device of claim 7, wherein the loop filter parameter set associated with the previously decoded picture area is incorporated in a picture area-level header.

10. The video coding device of claim 7, wherein the loop filter parameter set associated with the previously decoded picture area is incorporated in an Adaptive parameter set (APS).

11. The video coding device of claim 7, wherein the loop filter parameter set associated with the previously decoded picture area is stored in a buffer, and the buffer is reset when decoding a picture area being a random access point picture area of the bitstream.

12. The video coding device of claim 7, wherein the loop filter parameter set associated with the previously decoded picture area is stored in a buffer, and the buffer is reset after decoding a picture area being a random access point picture area of the bitstream.

13. A non-transitory computer readable medium storing a computer-executable program, the computer-executable program, when executed, causing a video decoding device to perform the following steps, for all picture areas of a bitstream:
deriving samples of a particular picture area of the bitstream; and
when a loop filter is determined to be applied to the particular picture area by referring to a loop filter parameter set associated with a previously decoded picture area of the bitstream,
identifying the loop filter parameter set associated with the previously decoded picture area, any picture area after the previously decoded picture area and before the particular picture area in terms of a displaying order being free from being a random access point picture area of the bitstream, and
applying the loop filter to the samples of the particular picture area by referring to the identified loop filter parameter set associated with the previously decoded picture area.

* * * * *

UNITED STATES PATENT AND TRADEMARK OFFICE
CERTIFICATE OF CORRECTION

Page 1 of 1

PATENT NO.         : 10,499,053 B2
APPLICATION NO.    : 15/521513
DATED              : December 3, 2019
INVENTOR(S)        : Ching-Yeh Chen et al.

It is certified that error appears in the above-identified patent and that said Letters Patent is hereby corrected as shown below:

On the Title Page

Item (71), the Applicant's address is incorrect. Item (71) should read:
-- (71) Applicant: MEDIATEK INC., Hsinchu (TW) --

Signed and Sealed this
Twenty-fourth Day of November, 2020

Andrei Iancu
*Director of the United States Patent and Trademark Office*